United States Patent Office 2,714,097
Patented July 26, 1955

2,714,097

AQUEOUS DISPERSIONS OF N-ALKOXYMETHYL-POLYHEXAMETHYLENE ADIPAMIDES AND THEIR APPLICATION

Frederick K. Watson and John L. Ludlow, Wilmington, Del., assignors to E. I. du Pont de Nemours and Company, Wilmington, Del., a corporation of Delaware No Drawing. Application November 27, 1951,
Serial No. 258,521

14 Claims. (Cl. 260—29.2)

This invention relates to dispersions of certain modified polyamides and to the application of these dispersions to substrates such as textile fabrics or the like.

The modified polyamides with which the present invention is concerned are the N-alkoxymethyl polyamides of the type described in the Cairns patent U. S. 2,430,860. In particular, these polyamides include the N-alkoxymethyl-modified polyhexamethylene adipamides in which from 20% to 60% of the hydrogen atoms in the original amide linkages are replaced by alkoxymethyl groups, and in which the alkoxy group contains from one to four carbon atoms.

It has been known for some time that N-alkoxymethyl-polyhexamethylene adipamides of this type can be converted into dispersions. It has also been known that these modified polyamides can be cured or cross-linked by means of heat and/or by treatment with an acid curing agent. There has not been available heretofore, however, any practical technique whereby these modified polyamides could be formed into dispersions which could subsequently be cured in a controlled manner.

It is an object of this invention to provide novel dispersions of modified polyamides. Another object of the invention is to provide dispersions of modified polyamides which also contain latent curing agents. A further object of the invention is to provide a method for applying dispersions of modified polyamides to suitable substrates, followed by controlled curing. Other objects of the invention will appear hereinafter.

In accordance with this invention, it has been discovered that certain salts, to be defined hereinafter, can advantageously be included in aqueous dispersions of N-alkoxymethylhexamethylene adipamides and that the dispersions containing these salts are stable. It has been discovered that dispersions of these modified polyamides can be applied to suitable substrates, together with the salt, and the whole then treated to bring about curing of the polyamide.

In accordance with a preferred embodiment of the invention, there are provided aqueous dispersions of N-alkoxymethylpolyhexamethylene adipamides having a pH of from 7.5 to 11.5 and containing from 0.5% to 10%, based upon the weight of the N-alkoxymethyl-polyhexamethylene adipamide, of ammonium citrate. N-methoxymethylpolyhexamethylene adipamides having from 25% to 50% of the amide hydrogen atoms replaced by methoxymethyl groups are preferred.

The salts which are useful in preparing the dispersions of this invention are the water soluble salts derived from a nitrogen-containing base and an acid having an ionization constant for the first hydrogen of at least $1 \times 10^{-5}$, said salt being decomposed by heat to yield an acidic residue at a temperature of less than 170° C.

These dispersions may be made up in any one of the various ways known to the art. A solution of the modified polyamide in a suitable solvent (for example, methanol, ethanol, or a phenol or mixtures thereof with water and/or higher alcohols) may be added to the aqueous medium in the presence of a suitable dispersing agent, in order to precipitate the polymer in the form of a dispersion. Generally, it is advisable to provide some kind of shearing action or turbulent flow, as by the use of a colloid mill, an orifice, a Venturi tube or the like. A preferred technique involves injecting an alcoholic solution of the modified polyamide, containing a dispersing agent, through one or more orifices or injection nozzles of 4 to 20 mils diameter into a rapidly moving stream of water having a high degree of turbulence. If desired, the dispersion can be produced directly from the mixture resulting from the reaction of the original polyhexamethylene adipamide with formaldehyde and alcohol to produce the modified polyamide.

The preparation of the dispersions may be carried out in either a batchwise or a continuous manner. The dispersing agent may be added continuously to the alcoholic solution of modified polyamide, or it may be added to the aqueous phase prior to mixing the aqueous phase with the alcoholic solution. Increasing the size of the orifices through which the alcoholic solution is passed has the effect of reducing the pressure required to force the solution through the orifice, and may also increase the maximum particle size of the dispersion, without, however, having as great an effect on the average particle size of the dispersion.

The dispersions of the present invention are aqueous dispersions, in the sense that the liquid phase must contain at least 50% by weight of water. Preferably, the liquid phase consists primarily of water, or contains from 90 to 99% of water. In addition to water, various other water-miscible or water-immiscible liquids may be present. It frequently happens that the dispersions are prepared from alcoholic solutions and as a result they may contain from 1 to 10% of one or more of the $C_1$ to $C_4$ alcohols. Other liquids such as acetone, which counteract the tendency of the alcohols to dissolve the polyamides, may also be present. Furthermore, one or more higher alcohols such as benzyl alcohol, furfuryl alcohol, and the like, which may have been employed to stabilize the original alcoholic solutions of the modified polyamides, may also be present. It is preferred that purified or distilled water be employed in preparing the dispersions.

The concentration, or solids content, of the N-alkoxymethylpolyhexamethylene adipamides in the dispersions may vary from about 1% to about 50%, based upon the total weight of the dispersion. Preferably the concentration is within the range of from 2% to 35% by weight. A relatively more concentrated dispersion can be cut to produce a more dilute dispersion, for instance, simply by the addition of more water or aqueous phase, preferably with agitation, or, if desired, the dispersions may be concentrated by flash evaporation to remove water. The addition of the ammonium citrate or other salt makes the dispersions somewhat more viscous or creamy than they would otherwise be.

The ultimate particle size of the N-alkoxymethylhexamethylene adipamide particles in the dispersions should be less than ten microns in diameter, and the particle size may go down to 0.1 micron, or even less. Preferably the dispersed particles vary in diameter from less than 0.1 micron up to about 3 microns and the average particle size is within the range of from 0.1 to 2 microns.

A wide variety of dispersing agents, including the anionic, cationic, and non-ionic types, may be employed in order to prevent coagulation of the particles. The anionic dispersing agents are very much preferred, and agents such as the sodium salts of the long-chain alkyl sulfates, the sodium or triethanolamine salts of sulfated highly branched chain secondary alcohols, the sodium salts of branched-chain alkyl sulphonates and the like are particularly useful. Dispersing agents should be present in amounts varying from 0.5% to 20%, and preferably from 1 to 10%, based upon the weight of the modified polyamide. In general, it is preferred to use relatively greater amounts of dispersing agent when producing the relatively more concentrated dispersions. Combinations of two or more dispersing agents, of the same type, or of different types, may be employed advantageously.

As pointed out above, the salts which are added to the dispersions of the present invention are those derived from a nitrogen-containing base and an acid having an ionization constant for the first hydrogen of at least $1 \times 10^{-5}$. The salt must be one which is soluble in water and it must also be one which yields acidic residues upon heating to dryness at a temperature of less than 170° C. Examples of such salts include the ammonium and amine salts of acids such as lactic acid, citric acid, chloracetic acid, itaconic acid, malonic acid, mesaconic acid, diglycolic acid, tartaric acid, maleic acid, hydroxyacetic acid, oxalic acid, glutaric acid, adipic acid, malic acid, fumaric acid, phthalic acid, salicyclic acid, formic acid, phosphoric acid, sulfuric acid, hydrochloric acid and the like.

The acid portion of the salt must be derived from an acid which is strong enough to bring about curing, or cross-linking of the N-alkoxymethylhexamethylene adipamide. Curing is desirable in order to decrease the solubility of the modified polyamide in organic solvents and in order to improve the wash fastness of the modified polyamide on the ultimate substrate. On the other hand, overcuring should be avoided since the modified polyamide then becomes brittle and loses adhesion to many substrates. According to a preferred embodiment of the invention, the salt which is employed is derived from an acid of only moderate strength such as lactic acid or citric acid, or other acids having an ionization constant of from about $1 \times 10^{-4}$ to about $1 \times 10^{-2}$. When using such acids, it is possible to control the degree of curing by controlling the temperature and time of the curing cycle, with the result that various degrees of curing may be achieved in a controlled manner while using only a single curing agent. Because of the flexibility which it provides in the curing step, as well as for other reasons, ammonium citrate is the preferred salt for addition to the dispersions of the present invention. Diammonium phosphate is also particularly useful.

In order to be satisfactory for the purposes of the present invention, the salts must decompose, in the presence or absence of water, at temperatures below 170° C. and preferably below 150° C. The nitrogen-containing portion may be removed as a vapor, or it may be converted into a complex with water or some other agent which may be present. Examples of suitable nitrogen-containing bases are compounds such as ammonia, the lower alkyl amines, morpholine, pyridine and the like, which boil off when the salts are heated above their decomposition temperatures. Ammonium citrate, for instance, decomposes when heated to a temperature of about 105° to 110° C., liberating citric acid and ammonia, which is evaporated. In addition to decomposing at the proper temperature, the salt must also be capable of existing at the proper degree of alkalinity at room temperature, in order to prevent coagulation of the dispersion or pre-curing, and when it does decompose, it must liberate the proper amount and the proper kind of acid to promote curing. Alternatively, an acidic salt may be used with added ammonia or amine, provided the system becomes acidic on heating or drying at a temperature below 170° C. Ammonium salts are preferred, as others tend to give off unpleasant fumes during curing.

The salts of certain high-boiling amines are not satisfactory for use in the present invention, because the high-boiling amines tend to remain in the modified polyamides and prevent the curing action of the acid. Amines of this type include the higher alkyl amines and the alkanol amines such as triethanolamine and in particular diethanolamine. By the same token, alkali salts such as sodium citrate, for example, are ineffective, of themselves, to bring about curing, since they do not liberate acids on heating. The addition of a compound such as diethanolamine to an N-alkoxymethylpolyhexamethylene adipamide may be advantageous where the polyamide is to be placed in contact with an acid-containing substance and it is desired to prevent curing, or over-curing, of the polyamide by means of the acid derived from an extraneous source. The use of from 1% to 10% of diethanolamine, for instance, not only prevents overcuring under such circumstances, but also contributes a plasticizing effect. In the present instance, however, a controlled amount of curing is desirable, and hence the presence of agents which interfere with the curing action of the acid is not generally advisable.

The ammonium citrate or other salt may be added to the modified polyamide in various ways. A preferred method involves mixing a preformed dispersion of the modified polyamide with an aqueous solution of the salt. When carrying out this mixing, it is important that the pH of the dispersion be carefully controlled in order to prevent the dispersion from coagulating. The difficulty with adding an acid curing agent, such as citric acid itself, to the dispersion is that the acid causes the dispersion to coagulate. When ammonium citrate, however, is added under the proper pH conditions, the dispersion will remain stable indefinitely. The pH of the dispersion at the time the salt is added should be within the range of from 7.5 to 11.5, and preferably within the range of from 9.0 to 10.5.

In the case of ammonium citrate, the pH of the aqueous solution is adjusted to about 7.5 to 11.5 before it is mixed with the polyamide dispersion and preferably is adjusted to the same pH as that of the polyamide dispersion. When the starting material is diammonium citrate, it is necessary to add ammonia in order to produce the proper pH, at the same time converting the diammonium citrate into triammonium citrate. It is preferable to add the polyamide dispersion to the buffered salt solution, with suitable agitation.

The preferred pH for the salt-containing dispersion will vary slightly, depending upon the particular salt, the type of dispersing agent employed, the concentration of the dispersion, etc. Lowering the pH tends in general to thicken the dispersion. If the pH is lowered, for instance, to 7.0 or below, the dispersion will agglomerate. In certain instances, it may be advantageous to maintain the pH of the dispersion at about 9.0 to 10.5 during storage, and then lower the pH to closer to 7.5 prior to applying it to the substrate. This might be accomplished in a controlled manner, for instance, by employing a buffer.

The viscosity of the dispersions is affected not only by the pH, as noted above, but it is also affected by the concentration of the modified polyamide, the concentration of the nitrogen containing salt, the heat history of the product, and the presence of other ingredients. If the dispersion is heated up as it is being produced and then cooled slowly without agitation, a thick, thixotropic dispersion is produced. On the other hand, if the mixture is heated up and then cooled with agitation, a thin dispersion is produced. The introduction of various additives will result in a change in the viscosity of the dispersions. It has been noted, for example, that the addition of urea produces a marked thickening effect. If the dispersions settle out, the modified polyamide can frequently be redispersed merely by shaking.

One of the most important uses of the dispersions of the present invention is in the treatment of textiles or fabrics. Treatment of filaments, fabrics, stockings, or films made of wool, cotton, rayon, nylon, acrylonitrile polymers, ethylene polymers, polyethylene terephthalate, leather and the like, or combination thereof, results in improved properties, such as increased abrasion resistance, increased snag resistance, anti-static properties, dye-fastness, shrink resistance, dimensional stability, increased water absorption, a better hand, a delustering effect, a reduction in fabric slippage, and, in some instances, increased tensile strength. A nylon fabric, for instance, can be passed through a bath containing the dispersions of the present invention and the fabric will pick a certain percentage of the modified polyamide from the dispersion. This method of applying dispersions is known as "padding" and can be carried out in either a batchwise or a continous manner. During the padding operation, the pH is maintained above 7.5. Upon subsequent heating of the fabric to bring about curing of the N-alkoxymethylpolyhexamethylene adipamide, there results a fabric possessing a very superior finish.

If desired, the ammonium citrate or other salt may be added to the fabric in a separate bath, either before or after the addition of the dispersion of the modified polyamide. It is sometimes advantageous to pretreat the fabric with a cation-active agent, such as the cationic quaternary ammonium compounds, in order to improve the hand of the finished fabric. Stearyl dimethyl benzyl ammonium chloride is a specific example of an effective cationic agent.

The amount of modified polyamide which should be introduced onto the textile fabric or other substrate will depend upon the nature of the substrate and the ultimate use to which it is to be put. In general, loadings of from 0.2% to 15% of modified polyamide, based upon the weight of the substrate, are employed. When treating nylon fabrics or stockings, for instance, loadings of from 0.5% to 6.0% are preferred.

After the dispersion has been applied to the fabric or other substrate, the treated article is heated to decompose the salt and bring about curing of the N-alkoxymethyl-polyhexamethylene adipamide. The time and temperature of the heating cycle depend upon the nature of the acid portion of the salt and the degree of curing which is desired. The temperature must be at least high enough to decompose the salt, i. e., at least about 50° C., and it must not be so high that the modified polyamide or the fabric base is harmed. In general, the temperature should not be raised above about 170° C. Curing temperatures of from about 100° to 150° C. are preferred. For example, when employing ammonium citrate, a temperature of about 120° C. for a period of about 5 minutes, or a temperature of about 150° C. for a period of about 2 minutes, brings about very satisfactory curing. If the acid portion of the salt is a stronger acid than citric acid, either shorter curing cycles or lower temperatures or both may be employed. In the case of acids which are not as strong as citric acid, more severe conditions of time and temperature may be required in order to produce the same degree of curing. When using a salt of a strong acid, the curing proceeds very rapidly once the salt has been decomposed. The advantage of using an agent such as diammonium phosphate, and in particular ammonium citrate, is that the degree of curing can be very accurately controlled by controlling the time and temperature, and slight deviations in the actual times and temperatures can be tolerated without appreciably altering the degree of curing. The cured product is less soluble than the uncured polyamide in solvents such as the lower alcohols, and is more wash fast. If desired, additional citric acid or other acid may be introduced to bring about the curing.

The following examples will illustrate certain features of the invention:

*Example 1.*—A dispersion of N-methoxymethylpolyhexamethylene adipamide, having about 35% of the amide hydrogen atoms replaced by methoxymethyl groups, is produced from a solution of 10 parts of the modified polyamide and 0.7 part (based on the polyamide) of sodium dodecyl sulfate in 90 parts of a 60% aqueous methanol solution. This solution is injected at a rate of four liters per hour through an orifice plate having eight 0.007 inch holes into a stream of water passing through a venturi. The water is maintained at a pH of substantially 10.5 by the addition of sodium hydroxide. The water flows at a rate of 6.6 gallons per minute through the venturi at such a rate that the Reynolds number at the point of mixing is about 110,000. The Reynolds number is a measure of the degree of turbulence and is defined on page 382 of the Third Edition of The Chemical Engineer's Handbook. The dispersion so produced is heated to 60° C. and circulated to a vacuum chamber, maintained at 100 mm. pressure, where the methanol in solution is distilled off. The essentially methanol-free dispersion is recirculated to the venturi dispersing section until the solids content of the dispersion is raised to 20%. The dispersion has an average particle diameter of 0.5 micron and contains less than 2% methanol.

A 4% solution of diammonium citrate in water is prepared and the pH is adjusted to 9.5–10.5 by the addition of concentrated ammonium hydroxide. One part of the ammonium citrate solution is then added, with stirring, to 3 parts of the polyamide dispersion to produce a stable dispersion containing about 5% salt, based on the modified polyamide. The concentration of modified polyamide in this dispersion is about 16%, but may be diluted with water to concentrations as low as 1%. This dispersion has good storage stability and shows no deterioration even after 30 days.

*Example 2.*—A sample of medium-weight unsized cotton broadcloth with an 80 x 80 weave construction is passed through a dispersion, prepared according to Example 1 and diluted to 5% solids content. The fabric is then squeezed between a pair of rubber rolls adjusted to a squeezing pressure of 240 lb./sq. in., from which it emerges with a 90% increase in weight, corresponding to 4.5% pick-up of the polymer. The fabric is then heated in an oven maintained at a temperature of 120° C. for 20 minutes in order to cure the polymer. Following the curing, the treated broadcloth exhibits a more crisp hand, with a marked increase in resistance to abrasion as indicated in the following table.

*Abrasion resistance of cotton fabric finished with cured N-methoxymethylpolyhexamethylene adipamide*

| | Cycles to complete abrasion | |
| --- | --- | --- |
| | Control, untreated | Treated |
| Initial—unwashed fabric | 1,220 | 4,980 |
| Washed—6 hours in "Launder-ometer" at 120° F. in presence of 0.25% household detergent | 1,550 | 4,995 |

The above data are based on a flex-abrasion test in which a one-inch wide section of the cloth is abraded for a length of 4 inches with a 90-degree bend over No. 400 sand paper wrapped over a ¼-inch steel mandrel. From the above test it is apparent that a four-fold increase in abrasion resistance is imparted to the cotton broadcloth. Furthermore, this increase is maintained even after prolonged washing. The increase in resistance to abrasion of from 1.5 to 16-fold is also obtainable by the same padding application using other cotton fabrics such as duck and 2 x 90 and 3 x 60 chambray fabrics.

*Example 3.*—Another sample of cotton broadcloth similar to that used in Example 2 is pretreated by immersion in a bath of a 0.25% aqueous solution of a commercial grade of a cationic surface active agent comprising cetyl dimethyl benzyl ammonium chloride, followed by passage between rubber padding rolls adjusted to a squeezing pressure of approximately 240 lbs./sq. in. The pretreated fabric is dried in an air oven at 80° C. It is then immersed in the dispersion of Example 1, diluted to 2% solids concentration, and passed through the squeeze rolls at a pressure of 240 lbs./sq. in. The resulting treated fabric is then placed in an oven at 140° C. to cure for 5 minutes. As a result of the pretreatment, the finished fabric shows a considerably softer hand than that finished according to the procedure of Example 2, and also has a three-fold increase in abrasion resistance over that of the original broadcloth.

*Example 4.*—A sample of nylon tafetta is immersed in a dispersion prepared according to Example 1, but containing 3% ammonium citrate, based on polymer, and diluted to 7.5% solids content, and squeezed through a pair of rubber wringer rolls. A pick-up of 1.13% polymer, based on fabric weight, is thus obtained. The fabric is then cured at 120° C. for 5 minutes and tested for wettability according to the procedure of the American Association of Textile Colorists tentative test 39–47 with the following results.

| Fabric | Average Wetting Time (Minutes) |
| --- | --- |
| Control—not treated | 21 |
| Treated | 10 |

In addition to reducing by at least one-half the wetting time, thus rendereing the fabric more water-absorptive, the treated fabric has a more pleasant hand and a delustered appearance. This improved water absorptiveness may be decreased by repeated washings with soap and water, but this effect may be counteracted by a subsequent washing with a non-ionic detergent.

The application of the same finish to a nylon marquisette at a loading of 1.8% of the polymer on the fabric, followed by a similar curing imparts considerable resistance to deformation caused by yarn slippage in the fabric.

*Example 5.*—A sample of cowhide leather is sprayed with a mixture of 2 parts of a 13% polymer dispersion, prepared according to Example 1, and one part of casein dispersion containing a red pigment. After drying in an oven at 80° C. for 15 minutes, the coating is ironed at a surface temperature of 149° C. for a period of 20 seconds. As a result of this treatment the original leather surface acquires a glossy finish which is resistant to crocking.

*Example 6.*—The dispersion of Example 1, diluted to 10% solids, is cast onto a flat glass surface and dried at a temperature of 80° C. to produce a continuous film which is 0.001 inch thick. This thin film, which is suitable for use as interliner in laminating textile fabrics, paper, wood and metal surfaces, is cured at 110° C. to produce a highly solvent-resistant film.

It is possible to obtain certain advantages by passing the fabric through a first bath containing only the dispersion of the modified polyamide, then passing the fabric through a bath containing ammonium citrate in the proper proportions, and thereafter curing. This technique, however necessitates the use of more than one bath and makes it more difficult to obtain an evenly distributed cured coating on the fabric.

The dispersions of the present invention may contain a number of different types of ingredients in addition to the modified polyamide. For example, the dispersions may contain pigments, dyes, delustering agents, other curing agents, antistatic agents, flame-resistant or flame-retardant agents, water repellents, antioxidants, heat stabilizers such as sodium phenyl phosphinate, plasticizers such as N-ethyl toluene sulfonamide, temporary plasticizers such as diethylene glycol, agents such as stearic acid, fillers, dimensional stabilizers such as urea-formaldehyde or melamine-formaldehyde resins and the like. A given dispersion may contain two or more of the N-alkoxymethyl polyamides of the same or of different degrees of substitution. Codispersions of the modified polyamides with other natural or synthetic resins, such as natural rubber, synthetic rubber, unmodified polyamides, ethylene polymers, and the like may also be prepared.

The dispersions may be employed in the preparation of adhesives, binders, coated articles including coatings for paper, furniture and bowling pins, impregnated articles, films and leather-like products. In producing films or sheets, the dispersions are cast onto a suitable surface, the water is removed by evaporation, and the film is subjected to heat to bring about agglomeration of the articles into a continuous film. The application of these dispersions as a binder to a fabric comprising nylon staple as the structural fiber, plus cellulose acetate as the extractable pore-former, results in an excellent leather-like product.

The big advantage of the dispersions of the present invention is that they contain within the dispersion itself a curing agent which does not render the dispersion unstable. By way of contrast, the curing agents known heretofore would coagulate the dispersion if added thereto. By using the dispersions of this invention, it is possible to treat fabrics by passing them through only a single bath. In this way the use of a series of two or more baths is eliminated and the use of inflammable and expensive solvents is also eliminated. Ammonium citrate is particularly useful as the curing agent because it does not promote curing at room temperature but only promotes curing at elevated temperatures which are above the temperatures encountered in the ordinary usage of the fabrics but not above those which are easily attained in commercial textile installations.

The teachings of the present invention with respect to the N-alkoxymethylpolyhexamethylene adipamide may also be applied advantageously to other soluble polyamides, notably, the alcohol soluble polyamides derived from mixtures of hexamethylenediammonium adipate, hexamethylenediammonium sebacate and caprolactam. The polyamides derived, for instance, from a mixture containing the foregoing constituents in the ratio of 40/30/30 are soluble in the lower alcohols, and produce excellent coatings on textile fabrics when applied in the form of dispersions in accordance with the teachings of this invention.

The formation of acid residues in the modified polyamides may be effected in several other ways. For example, thermal breakdown of esters and thermal or light activated oxidation of basic or neutral substances to acids are possible routes to curing acids from initially basic media.

Since many modifications of the processes and products described herein can be made by those skilled in the art without departing from the spirit and scope of the invention it is to be understood that the invention is not restricted except by the claims.

We claim:

1. An aqueous dispersion comprising from 1% to 50%, based upon the total weight of the dispersion, of an N-alkoxymethylpolyhexamethylene adipamide in the form of particles having an average diameter of less than 10 microns and having alkoxymethyl groups attached to from 20% to 60% of the amide nitrogen atoms; a dispersing agent; and from 0.5% to 10%, based upon the weight of the N-alkoxymethylpolyhexamethylene adipamide, of a water-soluble salt derived from a nitrogen-containing base and an acid having an ionization constant for the first hydrogen of at least $1 \times 10^{-5}$, said salt being decomposable by heat to yield an acidic residue at a temperature of less than 170° C.; said dispersion having a pH within the range of from 7.5 to 11.5.

2. An aqueous dispersion in accordance with claim 1 in which the weight of the N-alkoxymethylpolyhexamethylene adipamide is from 2% to 35% of the total weight of the dispersion.

3. An aqueous dispersion in accordance with claim 1 in which the liquid phase consists of at least 90% by weight of water.

4. An aqueous dispersion in accordance with claim 1 in which the N-alkoxymethylpolyhexamethylene adipamide is N-methoxymethylpolyhexamethylene adipamide having from 25% to 50% of the amide hydrogen atoms replaced by methoxymethyl groups.

5. An aqueous dispersion in accordance with claim 1 in which the N-alkoxymethylpolyhexamethylene adipamide particles have an average diameter of from 0.1 to 2 microns.

6. An aqueous dispersion in accordance with claim 1 in which the nitrogen-containing base is ammonia.

7. An aqueous dispersion in accordance with claim 1 in which the salt is ammonium citrate.

8. An aqueous dispersion in accordance with claim 1 in which the pH of the dispersion is from 9.0 to 10.5.

9. An aqueous dispersion comprising from 2% to 35% based upon the total weight of the dispersion, of N-methoxymethylpolyhexamethylene adipamide particles having an average diameter of from 0.1 to 2.0 microns, a dispersing agent, and from 0.5% to 10%, based upon the total weight of N - methoxymethylpolyhexamethylene adipamide, of ammonium citrate, the pH of said dispersion being within the range of from 9.0 to 10.5.

10. A process for preparing an aqueous dispersion which comprises mixing together an aqueous dispersion of N-alkoxymethylpolyhexamethylene adipamide and an aqueous solution of a water-soluble salt derived from a nitrogen-containing base and an acid having an ionization constant for the first hydrogen of at least $1 \times 10^{-5}$, said salt being decomposable by heat to yield an acidic residue at a temperature of less than 170° C., the mixing being carried out at a pH within the range of from 7.5 to 11.5, and the proportions of polymer and salt being such that the salt content in the dispersion will be between 0.5% and 10% of the weight of the polymer.

11. A process which comprises applying to a substrate an aqueous dispersion comprising (a) from 1% to 50%, based upon the total weight of the dispersion, of N-alkoxymethylpolyhexamethylene adipamide in the form of particles having a diameter of less than 10 microns, (b) a dispersing agent, and (c) from 0.5% to 10%, based on the weight of the N-alkoxymethylpolyhexamethylene adipamide, of a water-soluble salt derived from a nitrogen-containing base and an acid having an ionization constant for the first hydrogen of at least $1 \times 10^{-5}$, said salt being decomposable by heat to yield an acidic residue at a temperature of less than 170° C., and thereafter heating the substrate to a temperature not greater than 170° C. while in contact with the N-alkoxymethylpolyhexamethylene adipamide and the said salt.

12. A process which comprises passing a textile fabric through a bath containing the aqueous dispersion of claim 9, and thereafter subjecting the textile fabric to heat treatment at a temperature between about 100° and 150° C. to bring about curing of the N-methoxymethylpolyhexamethylene adipamide.

13. A process which comprises passing a nylon fabric through a bath containing the aqueous dispersion of claim 9, and thereafter subjecting the nylon fabric to heat treatment at a temperature between about 100° and 150° C. to bring about curing of the N-methoxymethylpolyhexamethylene adipamide.

14. A process which comprises passing a cotton fabric through a bath containing the aqueous dispersion of claim 9, and thereafter subjecting the cotton fabric to heat treatment at a temperature between about 100° and 150° C. to bring about curing of the N-methoxymethylpolyhexamethylene adipamide.

References Cited in the file of this patent

UNITED STATES PATENTS

| | | |
|---|---|---|
| 2,342,387 | Catlin | Feb. 22, 1944 |
| 2,467,186 | Cairns | Apr. 12, 1949 |